United States Patent Office 3,462,337
Patented Aug. 19, 1969

3,462,337
POLYAMIDE-POLYEPOXIDE CROSS-LINKED REACTION PRODUCT ADHESIVE COMPOSITION AND METHOD OF UNITING METAL SURFACES USING SAME
Bert Sorelle Gorton, Kennett Square, Pa., assignor to E. I. du Pont de Nemours and Company, Wilmington, Del., a corporation of Delaware
No Drawing. Continuation of application Ser. No. 440,276, Mar. 16, 1965. This application Feb. 1, 1968, Ser. No. 702,481
Int. Cl. C09j 3/16; C08g 45/12
U.S. Cl. 156—330                       8 Claims This application is a continuation of application Ser. No. 440,276, filed Mar. 16, 1965.

This invention relates to adhesive compositions and to structures having surfaces adhesively joined together therewith.

Adhesive compositions comprising a synthetic linear polyamide and a polyepoxide are old in the art. The polyepoxide used in these compositions of the art generally are those containing at least two epoxy groups per molecule with the remainder of the molecule being a carbon chain or a carbon chain interrupted with either linkages. The generally preferred of these polyepoxides are those prepared by the catalyzed reaction of a polyhydric alcohol, such as glycols, glycerine, trimethylol propane, polyhydric phenols, and polyphenols, with an excess of an epoxide such as epihalohydrins and alkylene oxides, for example those described in U.S. Patent No. 2,592,560.

The polyamide-polyepoxide compositions mentioned above have been used fairly extensively as adhesives, particularly as metal adhesives, that is, as adhesives for adhering one metal substrate to another metal substrate or to some other type of substrate such as wood, glass, leather, plastic and so forth. These compositions provide reasonably good bond strengths at room temperature and thus are satisfactory for some purposes. However, these compositions do not retain satisfactory bond strengths when the adhered substrates are subjected to elevated temperatures, especially when subjected to elevated temperatures in a moisture laden atmosphere or when directly contacted with hot or boiling water (which are both sometimes referred to as "hot-wet conditions").

For many applications it is essential to have an adhesive that will provide good bond strengths at elevated temperatures and under hot-wet conditions. For example, in the manufacture of metal containers for canning foodstuffs (the so-called "tin cans"), it is necessary to use a side-seam adhesive that will retain a satisfactory bond strength when the can is steam-sterilized. Another example is the provision of structural adhesives used in airplane construction, such as adhering wing surface metal to the structural frame, which will retain adequate bond strength under the high temperatures developed when the airplane is in supersonic speed flight. Also in the manufacture of cooking ware it is often convenient to use adhesives, for example, to join handles onto pots and pans, but it is obvious that the adhesive used must withstand the temperatures encountered when such pots and pans are used in cooking. Also, there exists a need for an adhesive for use in the manufacture of internal combustion engines, whereby the engine block may be die cast in two pieces and these two sections adhesively joined together. Not only must the adhesive withstand the elevated temperatures developed by the engine in operation, but in a water-cooled engine, the adhesive bond is subjected to hot-wet conditions. The polyamide-polyepoxide adhesives of the prior art are wholly unsatisfactory for such applications.

An object of this invention is to provide improved polyamide-polyepoxide adhesive compositions. Another object is to provide a polyamide-polyepoxide adhesive composition which provides good bond strengths between metal substrates and which retains adequate bond strengths at elevated temperatures, and furthermore, will retain adequate bond strengths under hot-wet conditions. A further object is to provide a process for bonding metal substrates together to form a bond with good strength at elevated temperatures. Other objects will appear hereinafter.

The objects of this invention are accomplished by a composition comprising 75 to 95 parts by weight of a polyamide having the recurring group of the formula:

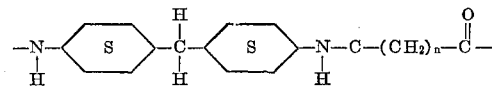

wherein $n$ is an integer between 6 and 10 inclusive, and 5 to 25 parts by weight of a polyepoxide having at least two epoxy groups per molecule, and preferably having a viscosity of 50 to 200,000 centipoises at 25° C.

The novel process of this invention comprises, in general, a method of uniting surfaces of metallic elements comprising applying to at least one of the surfaces a composition comprising about 75 to 95 parts by weight of a polyamide having the recurring group of the formula:

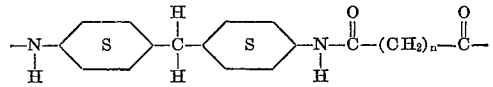

wherein $n$ is an integer of from 6 to 10 inclusive, and 5 to 25 parts by weight of a polyepoxide having at least two epoxy groups per molecule and preferably having a viscosity of 50 to 200,000 centipoises at 25° C., holding the surfaces contiguous to one another with the composition disposed therebetween, heating the surfaces and compositions to a temperature in the range of from about 400° F. to about 600° F. for from about 5 minutes to about 60 minutes and thereafter cooling.

The polyamides of this invention may be prepared by the condensation polymerization of bis(4-aminocyclohexyl)-methane with sebacic acid. The exact method of preparation is not critical and any convenient procedure known in the art may be utilized. For example, the polyamides may be prepared in accordance with the general procedure disclosed in U.S. Patent 2,715,620.

It is essential that the polyamide used have a molecular weight within the range of about 1,000 to about 35,000. The bond strength obtained by the use of a polyamide having a molecuar weight outside this range is too low to be of practical value. Furthermore, compositions derived from a polyamide having a molecular weight of less than about 1,000, do not possess adequate bond strength retention under hot-wet conditions. In addition, polyamides having molecular weights of more than about 35,000 do not readily mix with the polyepoxides of this invention and also compositions prepared from such polyamides require excessive time to form a bond between substrates. Therefore, in order to obtain practical bond strengths and the desired bond strength retention under elevated temperatures and hot-wet conditions it is necessary that the polyamide have a molecular weight that is within the aforesaid molecular weight range of about 1,000 to 35,000. Highest bond strengths are obtained by use of a polyamide having a molecular weight of about 5,000 to 15,000.

The polyepoxides used in this invention are known in the art, being disclosed, for example, in Lee and Neville, "Epoxy Resins," McGraw-Hill Book Company, New York, (1957), Chapter 1. These polyepoxides are characterized as having at least two epoxy groups per molecule, with the remainder of the molecule being a carbon chain or a carbon chain interrupted with ether linkages. The preferred polyepoxides are obtained by the catalyzed reaction of a polyhydric alcohol, such as glycols, glycerine, trimethylol propane, (4-hydroxyphenyl) propane (also known as bisphenol A), polyhydric phenols, and polyphenols, with an excess of an epoxide such as epihalohydrins, and alkylene oxides. Many of the polyepoxides are described in U.S. Patent 2,592,560.

Particularly preferred polyepoxides are those obtained by the reaction of bisphenol A and epichlorohydrin which have the empirical formula:

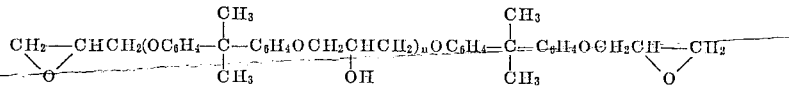

wherein $n$ has an average value of from 0 to about 10. Generally, $n$ will not be greater than 2 or 3, and it is preferably 0 to 1.

It is generally preferred that the polyepoxide be a syrup, that is, have a viscosity of from about 50 to about 200,000 centipoises at 25° C. In fact, for many uses it is essential that the polyepoxide be a syrup.

Relatively non-viscous polyepoxides or even polyepoxides having water-like viscosity can be blended with the polyamides of this invention to form adhesive compositions which exhibit bond strength retention at elevated temperatures and under hot-wet conditions. However, these non-viscous polyepoxides have relatively low boiling points and thus are relatively volatile. Therefore, it is virtually impossible to use compositions prepared from such non-viscous polyepoxides as an adhesive between substrates wherein it is desirable to use heat to promote the reaction between the polyepoxide and the polyamide. In addition, such compositions tend to flow readily when subjected to a combination of heat and pressure. Thus, they cannot be used to bond together structural joints since some of the polyepoxide flows out from between the substrates leaving an insufficient amount to provide an adequate bond. However, there are some important uses for such compositions wherein these aforementioned deficiencies are of no consequence but wherein it is necessary to have the elevated temperature and hot-wet condition properties which these compositions exhibit, for example, use as a potting resin in the manner familiar to those skilled in the art.

Extremely viscous (i.e., over 200,000 centipoises at 25° C.) or even solid polyepoxides can be blended with the polyamides of this invention, for example, by dissolving the polyamide and the polyepoxide in a suitable solvent. However, the use of such an extremely viscous or solid polyepoxide imparts brittleness to the adhesive bond thus making such polyepoxides unsuitable for any use wherein impact strength is required. Even so, there are important applications wherein impact strength is not essential but wherein bond strength retention at elevated temperature and under hot-wet conditions is required, for example, in adhering name plates onto engine blocks.

Most of the polyepoxides of this invention have an epoxide equivalence of approximately 50 to 500. Epoxide equivalence is the weight of the polyepoxide in grams which contains one gram chemical equivalent of epoxy radical. It is to be understood that the epoxide equivalence is merely a convenient descriptive characterization value and is not a critical limitation of the polyepoxide operable in this invention.

The polyamides and polyepoxides used in the practice of this invention should be blended together in the proportions of 75 to 95 parts by weight of polyamide and 5 to 25 parts by weight of polyepoxide. Proportions outside of these specified ranges will result in compositions which do not possess bond strength retention at high temperatures and under hot-wet conditions.

The manner in which the polyamides and polyepoxides of this invention are blended together is not critical. The polyamide may be dissolved in a suitable polyamide solvent such as dimethylacetamide or dimethylformamide and the polyepoxide may then be added to the solution and mixed therewith. This polyamide solvent may be used in an amount sufficient to form a paste which can be directly applied to the surfaces to be adhered, or enough solvent can be used to form a liquid composition. Ultimately, the polyamide solvent can be removed by any convenient method, e.g., precipitation, air drying, spray drying, etc., to obtain a powdered blend of the polyamide and polyepoxide. The resultant powder may then be used to adhere surfaces together in the manner shown hereinbelow. Preferably, a fine powder of the polyamide is intimately mixed together with the polyepoxide without the use of a polyamide solvent. If desired, a suitable solvent for the polyepoxide may be used to facilitate this mixing procedure, or sufficient polyepoxide solvent may be used to form a paste. Suitable solvents for polyepoxides include acetone, methyl ethyl ketone, toluene and other aromatic solvents, trichloroethylene, perchloroethylene, and other chlorinated hydrocarbon solvents and the like. The compositions of this invention may also be prepared in the physical form of a film or tape by any of the methods familiar in the art. Generally, higher bond strengths are obtained when the composition is prepared by mixing the powdered polyamide and the polyepoxide without the use of a polyamide solvent.

The compositions of this invention may be used as adhesives for many different types of materials such as wood and other cellulosic materials, leather, glass, plastics and so forth. However, these compositions are primarily intended for use in adhering together metal substrates. These compositions can be used as adhesives for any metal including aluminum, magnesium, molybdenum, tungsten, iron and the iron alloys such as the various steels and the like.

In the practice of this invention, it is preferred to thoroughly clean or degrease the metal surface to be adhered and then etch the surface by treatment with acid prior to applying the adhesive composition. If the surfaces to be adhered together can be conveniently placed in a horizontal position, it is preferred to use a powder composition preferably prepared as mentioned above by mixing the polyamide and polyepoxide together without the use of a polyamide solvent. Otherwise a film, tape or paste composition can be used. A relatively thin layer of the adhesive composition is applied to one of the surfaces. Then the other surface is placed into position and this assembly is pressed under a relatively light load (i.e., about 10 to 2,000 p.s.i.) at a temperature of about 350° F. to 600° F. for sufficient time to complete the interaction (crosslinking) of the polyamide and the polyepoxide, usually about 10 to 60 minutes. The metals thus joined are ready for use as desired. Other procedures for using the compositions of this invention will be obvious to those skilled in the art.

The following examples are given to more fully illustrate the invention. In each of these examples, to provide correlative data, strips of 7075–T6 Aluminum (Lyman, Ed., Metals Handbook, vol. I, "Properties and Selection of Metals," American Society for Metals, Novelty, Ohio, 8th ed., 1961, p. 948) were used as the metal substrates. These aluminum strips were 0.064 inch thick and measured 1 x 3 inches. These strips were degreased by suspending them in trichloroethylene vapor. Following the degreasing, these strips were etched in a chromium acid bath at 70° C. for 30 minutes, washed in cool water and then dried. Standard lap joints were prepared by applying the various compositions shown onto the surface of one strip and then positioning another strip on top thereof to form a 0.5 inch overlap (ASTM D1002–53T). These lap joints were then pressed together with about 15 to 50 p.s.i. pressure at 450° F. for a specified time. The bond strengths of the various adhesive compositions were evaluated by determining the lap shear strengths of the prepared lap joints, in accordance with ASTM D1002–53T, whereby the strips were pulled apart at a rate of 0.2 in./min. at a jaw separation of 4½ inches.

Example I

A one gram sample of finely powdered (through 100 mesh) poly[4(4-cyclohexylmethyl) cyclohexyl sebacamide] having a molecular weight of about 10,000 was blended with 0.05 gram of a commercially available polyepoxide by grinding in a mortar for several minutes. The polyepoxide was the reaction product of bisphenol A and epichlorohydrin having a manufacturer's specified viscosity of 5,000 to 15,000 centipoises at 25° C., an average molecular weight of 350 to 400, and a specified epoxide equivalence of 175 to 210. Lap joints were prepared as described above, with the specified time being 15 minutes using this resultant powder, and tested. The average lap shear strength at room temperature was 5,640 p.s.i. The average lap shear strength at 100° C. was extrapolated to be greater than 3,200 p.s.i. and at 150° C. was extrapolated to be greater than 2,200 p.s.i.

The following example shows results obtained with a composition based upon a nylon-type interpolyamide used in the art to obtain the best results heretofore attainable for a polyamide-polyepoxide metal adhesive composition.

Example II

Example I was repeated using in place of the poly-[4(4-cyclohexylmethyl) cyclohexyl sebacamide], an interpolyamide of about 40% by weight hexamethylene adipamide, about 30% hexamethylene sebacamide and about 30% caprolactam, having a molecular weight of about 25,000. The polyepoxide was the same as in Example I. The ratio of polyamide used was 85 to 15. In addition, approximately 1.5 parts by weight of dicyandiamide were added. The lap joints were formed as in Example I except that the temperature was 350° F. and the time was one hour. The changes in conditions from those shown in Example I were found by experimental trial to be necessary in order to obtain the best results with this interpolyamide. The average lap shear strength at room temperature was 7,000. The average lap shear strength at 100° C. was 2,600 p.s.i., and at 150° C. was 2,400 p.s.i. Lap joints tested after being heated in a steam autoclave at 250° F. and 15 p.s.i.g. for 24 hours had an average lap shear strength of 940 p.s.i. Lap joints tested after such steam autoclave treatment for 66 hours had an average lap shear strength of 360 p.s.i. Lap joints tested after boiling in water for 15 hours had an average lap shear strength of 1,900 p.s.i.

The following example was taken from data reported in Lee and Neville, "Epoxy Resins," McGraw-Hill Book Company, New York, (1957), page 224. This example shows results obtained from a fatty acid-type polyamide.

Example III

Fifty parts by weight of a polyamide such as the reaction product of triethylene diamine and the dimeric acid of linoleic acid having an amine equivalence of 210 to 230 which is the ml. of KOH equivalent to the base content of 1 gram of the polyamide as determined by titration with HCl, is blended with 50 parts of the polyepoxide such as used in Example I. The average lap shear strength at room temperature is 3,200 p.s.i., at 82° C. is 1,500 p.s.i. and at 120° C. is 600 p.s.i. These properties are obviously inferior to those of the composition of the present invention.

Example IV

A one gram sample of finely powdered (through 100 mesh) poly[4(4-cyclohexylmethyl) cyclohexyl sebacamide] having a molecular weight of approximately 10,000 was blended with 0.10 gram of the polyepoxide used in Example I. Lap joints were made as in Example I with the specified time being 60 minutes. The average lap shear strength at room temperature was 5,600 p.s.i. The average lap shear strength at 100° C. was estimated to be greater than 3,200 p.s.i. and at 150° C. was estimated to be greater than 2,200 p.s.i.

Although the inherent viscosity of the poly[4(4-cyclohexylmethyl) cyclohexyl sebacamide] as used in the example was 0.6 as measured in m-cresol (c.=0.5), it should be obvious that a polyamide having any molecular weight which flows well as a blend and gives good blend strength may be advantageously utilized. Similarly, although it is provided to utilize sebacic acid as the condensation polymer, other dicarboxylic aliphatic acids such as azelaic acid may be employed.

This invention has been described in considerable detail, but since many obvious modifications and variations of these details can be made without departure from the spirit and scope of this invention, it is to be understood that this invention is not intended to be limited except as shown in the appended claims.

What is claimed is:

1. A composition comprising about 75–95 parts by weight of a polyamide having the recurring group of the formula:

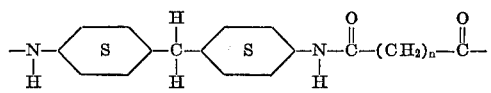

wherein $n$ is an integer of from 6 to 10 inclusive, and about 5–25 parts by weight of a polyepoxide having at least two epoxy groups per molecule.

2. A composition according to claim 1 wherein said polyepoxide has a viscosity in the range of from about 50 to 200,000 centipoises at 25° C.

3. The composition of claim 1 wherein said polyamide has a molecular weight in the range of from about 1,000 to 35,000.

4. The composition of claim 3 wherein said polyepoxide has a viscosity in the range of from about 50 to 200,000 centipoises at 25° C.

5. A method of uniting surfaces of metallic elements which comprises applying to at least one of said surfaces a composition comprising about 75–95 parts by weight of a polyamide having the recurring group of the formula:

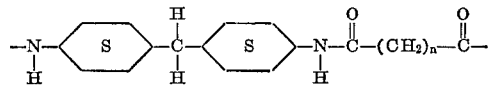

wherein $n$ is an integer of from 6 to 10, inclusive, and about 5–25 parts by weight of a polyepoxide having at least two epoxy groups per molecule, holding said surfaces contiguous to one another with said composition disposed therebetween, heating said surfaces and said composition to a temperature in the range of from about 400° F. to about 600° F. for from about 5 minutes to about 60 minutes and thereafter cooling.

6. A method according to claim 5 wherein said polyepoxide has a viscosity in the range of from about 50 to about 200,000 centipoises at 25° C.

7. A method according to claim 5 wherein said polyamide is poly[4(4-cyclohexylmethyl) cyclohexyl sebacamide].

8. A composition consisting essentially of 1 part by weight of poly[4(4-cyclohexylmethyl) cyclohexyl sebacamide] having a molecular weight of about 10,000 and 0.05 weight part of a polyepoxide reaction product of bisphenol A and epichlorohydrin having an average molecular weight of 350 to 400.

References Cited

UNITED STATES PATENTS 3,336,415   8/1967   Kennedy _____ 161—214 X
3,406,053  10/1968   Jaenicke _____ 156—330 X HAROLD ANSHER, Primary Examiner U.S. Cl. X.R.

156—331; 161—186, 227; 260—830